United States Patent
Ge et al.

(10) Patent No.: US 9,794,084 B2
(45) Date of Patent: Oct. 17, 2017

(54) METHOD AND APPARATUS FOR IMPLEMENTING A FLEXIBLE VIRTUAL LOCAL AREA NETWORK

(71) Applicant: International Business Machines Corporation, Armonk, NY (US)

(72) Inventors: Yi Ge, Beijing (CN); Hang Liu, Beijing (CN); Yue Zhang, Beijing (CN); Kai Zheng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 13/687,010

(22) Filed: Nov. 28, 2012

(65) Prior Publication Data

US 2013/0136123 A1    May 30, 2013

(30) Foreign Application Priority Data

Nov. 30, 2011  (CN) .......................... 2011 1 0389365

(51) Int. Cl.
*H04L 12/46* (2006.01)
*H04L 12/931* (2013.01)

(52) U.S. Cl.
CPC ...... *H04L 12/4641* (2013.01); *H04L 12/4645* (2013.01); *H04L 12/4675* (2013.01); *H04L 49/201* (2013.01); *H04L 49/351* (2013.01)

(58) Field of Classification Search
CPC . H04L 12/4641; H04L 12/4633; H04L 45/74; H04L 49/354; H04L 61/1511; H04L 12/465; H04L 49/351; H04L 45/72; H04L 45/745; H04L 61/25; H04L 61/2503; H04L 45/00; H04L 12/18; H04L 12/185; H04L 12/4645; H04L 12/4675; H04L 45/54; H04L 49/70; H04L 49/201; H04L 2212/00
USPC .......... 370/401, 392, 395.53, 390, 312, 432
See application file for complete search history.

(56) References Cited

U.S. PATENT DOCUMENTS

| | | | | |
|---|---|---|---|---|
| 5,825,772 | A * | 10/1998 | Dobbins et al. | 370/396 |
| 6,847,620 | B1 * | 1/2005 | Meier | 370/328 |
| 7,088,689 | B2 * | 8/2006 | Lee et al. | 370/282 |
| 8,194,674 | B1 * | 6/2012 | Pagel et al. | 370/393 |

(Continued)

FOREIGN PATENT DOCUMENTS

| | | |
|---|---|---|
| CN | 1705307 A | 12/2005 |
| CN | 1905528 A | 1/2007 |

(Continued)

*Primary Examiner* — Candal Elpenord
*Assistant Examiner* — Ricardo Castaneyra
(74) *Attorney, Agent, or Firm* — Scully, Scott, Murphy & Presser, P.C.; Jennifer R. Davis, Esq.

(57) ABSTRACT

A method and apparatus for implementing a virtual local area network. The method includes determining a global virtual local area network for transmitting a data frame in response to receiving the data frame at a first switch, encapsulating the data frame based at least in part on said determination and transmitting it to at least one second switch over the determined global virtual local area network. The data frame is received at the second switch and an identifier of the global virtual local area network is obtained according to the data frame. Based at least in part on the identifier of the global virtual local area network, it is determined that which local virtual local area network served by the second switch the de-capsulated data frame can be sent to.

16 Claims, 10 Drawing Sheets

(56) References Cited

U.S. PATENT DOCUMENTS

| | | | |
|---|---|---|---|
| 8,320,293 B2* | 11/2012 | Zheng et al. | 370/312 |
| 2003/0123453 A1 | 7/2003 | Ooghe et al. | |
| 2003/0133412 A1 | 7/2003 | Iyer et al. | |
| 2003/0210671 A1* | 11/2003 | Eglin | 370/338 |
| 2004/0042454 A1 | 3/2004 | Zabihi et al. | |
| 2004/0165600 A1* | 8/2004 | Lee | 370/395.53 |
| 2004/0174887 A1 | 9/2004 | Lee | |
| 2006/0248227 A1 | 11/2006 | Hato | |
| 2007/0211730 A1 | 9/2007 | Cuthbert et al. | |
| 2007/0223493 A1* | 9/2007 | Sridhar et al. | 370/395.53 |
| 2009/0037607 A1 | 2/2009 | Farinacci et al. | |
| 2009/0279552 A1 | 11/2009 | Dong | |
| 2009/0323689 A1* | 12/2009 | Saito | 370/390 |
| 2010/0226368 A1* | 9/2010 | Mack-Crane et al. | 370/390 |
| 2010/0290445 A1* | 11/2010 | Ankaiah et al. | 370/338 |
| 2011/0007744 A1 | 1/2011 | Melman et al. | |
| 2011/0222538 A1 | 9/2011 | Bardalai et al. | |
| 2011/0299527 A1* | 12/2011 | Yu et al. | 370/390 |

FOREIGN PATENT DOCUMENTS

| | | |
|---|---|---|
| CN | 1937569 A | 3/2007 |
| CN | 101127681 A | 2/2008 |
| EP | 1 318 628 B1 | 6/2003 |
| EP | 1936869 | 6/2008 |

* cited by examiner

METHOD AND APPARATUS FOR IMPLEMENTING A FLEXIBLE VIRTUAL LOCAL AREA NETWORK

CROSS-REFERENCE TO RELATED APPLICATION

This application claims priority under 35 U.S.C. §119 from Chinese Patent Application No. 201110389365.4 filed Nov. 30, 2011, the entire contents of which are incorporated herein by reference.

BACKGROUND OF THE INVENTION

Field of the Invention

Various embodiments of the present invention generally relate to a Virtual Local Area Network (VLAN), and in particular, to a Layer 2 (L2) Virtual Ethernet over an underlying Layer 3 (L3) IP network.

Description of the Related Art

VLAN is widely used in traditional customer private networks. VLAN is a widely used mechanism to handle and implement isolation and connectivity. Broadcasting can be performed within VLANs, while machines/Virtual Machines (VMs) belonging to different VLANs cannot communicate with each other. Traffic among switches can carry VLAN tags to implement connections between members in the same VLAN but connected to different switches.

As application environments of VLAN are expanding, conventional VLAN implementations (such as IEEE 802.1Q, etc.) face various challenges. When the configuration structure and application scenario of a VLAN change, for example, when customers migrate their VLANs into a Data Center Network (DCN), many requirements are imposed on VLAN implementations. These requirements are needed to guarantee the security, robustness and scalability of a VLAN. Furthermore, devices and apparatuses in a VLAN are also required to keep working in the same way as they usually do in their private network.

On the other hand, in a multi-tenant environment, each tenant needs to define its own VLAN, and since both physical nodes and VM instances are increasing, the number of VLANs is also increasing rapidly. Identifiers currently available for VLANs (VLAN IDs) can be insufficient. In a modern data center, at any moment quite a few VMs can be in a migration state and VM migration across the VLAN boundary needs many configuration changes in switches. Due to the deployment of multi-platform applications from numerous tenants, isolation and connectivity are key factors to be considered, because isolation ensures the security, robustness and scalability, while connectivity ensures the dynamic resource allocation and scheduling. However, current deployment schemes and technical applications for VLANs cannot satisfy the abovementioned requirements, and accordingly, are unable to provide desired services to more users in a larger-scale network environment.

SUMMARY OF THE INVENTION

In view of the above reasons, the present invention proposes a solution for implementing a flexible virtual local area network, aiming to overcome at least one of problems existing in the prior arts.

According to a first aspect of the present invention, a method for implementing a VLAN is provided, the method comprising: determining a global VLAN for transmitting a data frame, in response to receiving the data frame at a first switch, wherein the data frame is from one of one or more first local VLANs served by the first switch; encapsulating the data frame based at least in part on the determination of the global VLAN; and transmitting the encapsulated data frame over the global VLAN for sending the data frame to at least one second switch, wherein the second switch serves one or more second local VLANs.

According to a second aspect of the present invention, an apparatus for implementing a VLAN is provided, the apparatus comprising: a determining unit configured to determine a global VLAN for transmitting a data frame, in response to receiving the data frame at a first switch, wherein the data frame is from one of one or more first local VLANs served by the first switch; an encapsulating unit configured to encapsulate the data frame based at least in part on the determination of the global VLAN; and a transmitting unit configured to transmit the encapsulated data frame over the global VLAN for sending the data frame to at least one second switch, wherein the second switch serves one or more second local VLANs.

According to a third aspect of the present invention, a method for implementing a VLAN is provided, the method comprising: receiving a data frame transmitted over a global VLAN, wherein the data frame is from one of one or more first local VLANs served by a first switch; obtaining an identifier of the global VLAN according to the data frame; and determining, based at least in part on the identifier of the global VLAN, an identifier of one of one or more second local VLANs served by a second switch to send the de-capsulated data frame to the second local VLAN identified by the determined identifier.

According to a fourth aspect of the present invention, an apparatus for implementing a VLAN is provided, the apparatus comprising: a receiving unit configured to receive a data frame transmitted over a global VLAN, wherein the data frame is from one of one or more first local VLANs served by a first switch; an obtaining unit configured to obtain an identifier of the global VLAN according to the data frame; and a determining unit configured to determine, based at least in part on the identifier of the global VLAN, an identifier of one of one or more second local VLANs served by a second switch to send the de-capsulated data frame to the second local VLAN identified by the determined identifier.

According to a fifth aspect of the present invention, a method for configuring a VLAN is provided, the method comprising: determining, in response to detecting that a host enters into a first local VLAN served by a first switch, a global VLAN to which the host belongs, for transmitting a data frame from the host to at least one second switch over the global VLAN, wherein the second switch serves one or more second local VLANs; adding an address of the first switch into a directory server to correspond to an address of the host stored on the directory server; and creating a mapping record at the first switch if the host is the first host in the first local VLAN, which records correspondence relationship between an identifier of the first local VLAN and an identifier of the global VLAN.

According to a sixth aspect of the present invention, an apparatus for configuring a VLAN is provided, the apparatus comprising: a determining unit configured to determine, in response to detecting that a host enters into a first local VLAN served by a first switch, a global VLAN to which the host belongs, for transmitting a data frame from the host to at least one second switch over the global VLAN, wherein the second switch serves one or more second local VLANs; an adding unit configured to add an address of the first switch into a directory server to correspond to an address of the host stored on the directory server; and a creating unit configured to create a mapping record at the first switch if the host is the first host in the first local VLAN, which records correspondence relationship between an identifier of the first local VLAN and an identifier of the global VLAN.

With the method and apparatus provided by the present invention, good compatibility with existing VLAN standards or protocols (such as IEEE 802.1Q, etc.) can be achieved, and requirements for isolation and connectivity of a VLAN in an application environment with a multi-tenant and multi-site data center can be satisfied.

BRIEF DESCRIPTION OF THE DRAWINGS

Aspects of the present invention will be further understood from the following descriptions of various exemplary embodiments in combination with accompanying drawings, in which.

DETAILED DESCRIPTION OF THE PREFERRED EMBODIMENT

Figure 1:
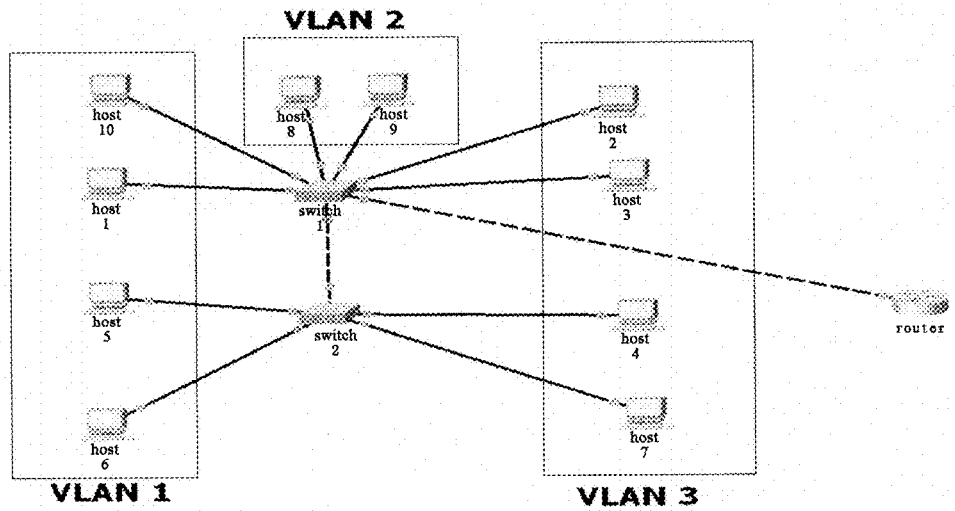
FIG. 1 schematically illustrates a network layout of VLANs.

The embodiments of the present invention are described in detail below. As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system". Furthermore, aspects of the present invention can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be any computer readable medium that is not a computer readable storage medium and that can communicate, propagate, or transport a program for use by or in connection with an instruction execution system, apparatus, or device. Program code embodied on a computer readable medium can be transmitted using any appropriate medium, including but not limited to wireless, wireline, optical fiber cable, RF, etc., or any suitable combination of the foregoing.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions means which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention is described below with reference to accompanying drawings in conjunction with embodiments. The description is merely for illustration, but not to limit the scope of the present invention.

FIG. 1 schematically illustrates a network layout of VLANs. As shown in FIG. 1, the network can comprise VLAN 1, VLAN 2 and VLAN 3, and there is an isolated broadcast domain on a physical LAN. Although only three VLANs are shown in FIG. 1, it can be understood that more VLANs can be deployed. LAN memberships can be configured through software instead of physically re-locating devices or connections. For example, some involved configurations can comprise configuring switch ports, tagging data frames when entering into a VLAN, looking up Media Access Control (MAC) table to switch/flood data frames to trunk link, untagging when exiting from a VLAN, and etc. By establishing VLAN memberships, static VLANs (for example, Port-based VLANs) or dynamic VLANs (for example, Source MAC Address-based) can be formed. All hosts/ports not configured can belong to a "Default VLAN", and all of them are in one broadcast domain.

Figure 2:
FIG. 2 schematically illustrates a tag format of IEEE 802.1Q.

For example, VLAN can be based on standards or protocols such as IEEE 802.1Q. FIG. 2 schematically illustrates a tag format of IEEE 802.1Q. Compared with a format in Ethernet version, according to specifications of IEEE 802.1Q, a 4-byte tag header is inserted between a Source MAC Address field and a Frame Type field, comprising 2-byte Tag Protocol Identifier (TPID) and 2-byte Tag Control Information (TCI) field, wherein TCI contains 12-bit VLAN Identifier (VID). VLAN ID uniquely identifies the VLAN to which the data frame belongs.

As the network scale is expanding and the number of VLAN tenants is increasing, 12-bit VLAN ID can be insufficient to support application environments such as DCN, and in a multi-tenant case, the same VLAN ID can be reused in different user's network contexts. In the current VLAN implementation, scaling VLAN over a multi-site data center is also complex. Moreover, management overhead increases with the number of VLANs and configuration changing of VLANs.

According to the conventional VLAN technology, broadcast can be done within a VLAN, while machines belonging to different VLANs cannot communicate with each other. However, a host or server belonging to a certain VLAN can want to transmit its data frame to a host or server belonging to another different VLAN. A user can also often change VLAN configurations, for example, allowing a virtual machine belonging to a certain VLAN to migrate across the VLAN boundary. Moreover, in specific application scenarios (such as a DCN environment), it can be desired that all hosts not configured into a VLAN are initially isolated, instead of belonging to a default VLAN (broadcast domain).

In view of the problems of at least one aspect, the present invention provides a solution for implementing a VLAN, which can be carried out in a DCN. The solution adopts a flexible and efficient approach to configure a VLAN, which can have good compatibility with existing VLAN implementation standards or protocols (such as IEEE 802.1Q, etc.), and also can satisfy various requirements of isolation and connectivity for a VLAN in an application environment such as a multi-tenant and multi-site data center.

Figure 3:
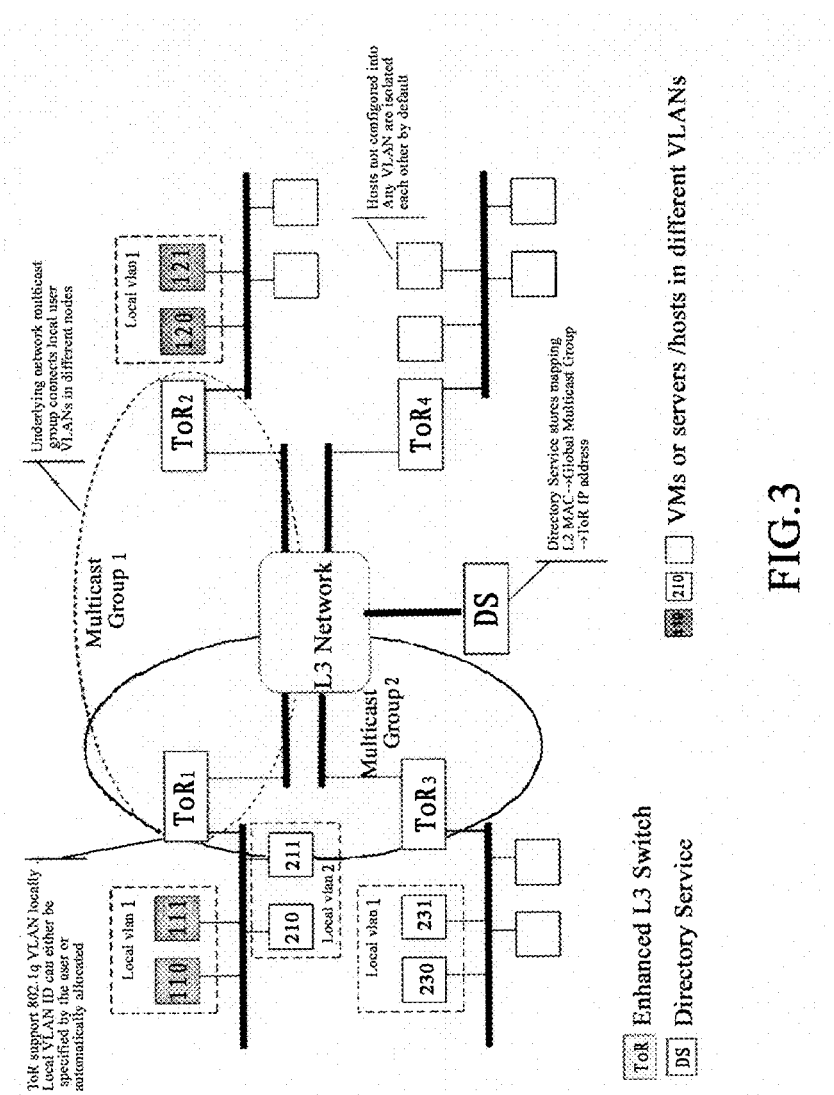
FIG. 3 is a schematic diagram illustrating a L2 virtual Ethernet system over an underlying L3 IP network according to an exemplary embodiment of the present invention.

FIG. 3 is a schematic diagram illustrating a L2 virtual Ethernet system over an underlying L3 IP network according to an exemplary embodiment of the present invention. As shown in FIG. 3, the system comprises switches $ToR_1$, $ToR_2$, $ToR_3$ and $ToR_4$, as well as a Directory Server (DS). Switches $ToR_1$, $ToR_2$, $ToR_3$ and $ToR_4$ can have L3 access switch functionality, respectively. A switch and a directory server connected by a universal L3 IP network can communicate with each other. Each access switch can connect one or more L2 Ethernet local networks (for example, Local VLAN 1 and Local VLAN 2 shown in FIG. 3), and the switch and the connected local networks can be collectively called as a node or a local node. For example, a switch (TOR) can support one or more IEEE 802.1Q VLANs locally, and Local VLAN ID (such as IEEE 802.1Q tag) can either be automatically allocated or specified by a user. Additionally or alternatively, the switch can also support a L2 Ethernet without using IEEE 802.1Q tag, and in this case, all local servers/hosts can be considered to be within the same IEEE 802.1 Q VLAN. Thus, Ethernet within the node according to embodiments of the present invention can support functionalities of IEEE 802.1Q VLAN. IEEE 802.1Q VLANs within a node can be called as Local VLANs, while VLANs in terms of a virtual L2 Ethernet over an underlying L3 IP network in global can be called as Global VLANs. Each Local VLAN can include one or more hosts (or server hosts). As shown in FIG. 3, Local VLAN 1 supported by $ToR_1$ can include hosts 110 and 111, Local VLAN 2 supported by $ToR_1$ can include hosts 210 and 211, Local VLAN 1 supported by $ToR_2$ can include hosts 120 and 121, and Local VLAN 1 supported by $ToR_3$ can include hosts 230 and 231. Access switch $ToR_4$ does not support any Local VLAN. In an exemplary embodiment of the present invention, hosts which are not configured into any VLAN are isolated from each other by default.

Considering that a L3 network can provide isolation and connectivity naturally, the underlying L3 IP network multicast group is applied to an exemplary embodiment of the present invention. The multicast group divides a plurality of hosts into a group where multicast can be treated as "broadcast" within the group. If an appropriate route table is set, a router and routing protocol can ensure every host can communicate with others. For example, a L3 network multicast group can connect users of local VLANs in different local nodes. FIG. 3 shows Multicast Group 1 (as denoted by dotted line circle) and Multicast Group 2 (as denoted by solid line circle), wherein Multicast Group 1 connects $ToR_1$ and $ToR_2$ as well as their supported Local VLANs, while Multicast Group 2 connects $ToR_1$ and $ToR_3$ as well as their supported local VLANs. A multicast group can be considered as a global VLAN, for example, Multicast Group 1 corresponding to Global VLAN 1 while Multicast Group 2 corresponding to Global VLAN 2. Although FIG. 3 only shows a system including two multicast groups and four switches, it can be understood that the system can include more multicast groups and more switches, and that each switch can support more local VLANs and each local VLAN can include more hosts. According to an exemplary embodiment of the present invention, a switch (such as $ToR_4$ shown in FIG. 3) can choose not to join in any multicast group. Alternatively, a switch (such as $ToR_1$, $ToR_2$ and $ToR_3$ shown in FIG. 3) can also choose to join in one or more multicast groups.

According to an exemplary embodiment of the present invention, an administrator can define VLAN definition information for all hosts on a directory server, and these hosts (such as hosts 110, 111, 120, 121, 210, 211, 230 and 231 shown in FIG. 3) can be distributed within respective local nodes. For example, a mapping relationship among an address of a host (such as a L2 MAC address, etc.), a global multicast group identifier (such as a multicast group address, etc.) and a switch address (such as a L3 IP address, etc.) can be stored on the directory server. In an exemplary embodiment of the present invention, by looking up corresponding information on the directory server, an access switch can construct an encapsulation of a L3 IP packet for a L2 Ethernet unicast frame, so as to implement L2 Ethernet unicast communications between server hosts belonging to the same global VLAN but located in different local nodes. Additionally or alternatively, in another exemplary embodiment of the present invention, utilizing the multicast technology for L3 IP network, the access switch can encapsulate a L2 network broadcast packet with a L3 IP network multicast packet, so as to implement L2 Ethernet broadcast communications within a global VLAN between server hosts belonging to the same global VLAN but located in different local nodes. In still another exemplary embodiment of the present invention, according to the definition information on the directory server, communications between server hosts belonging to different global VLANs can be blocked by the access switch, so as to separate ranges of communications between server hosts by means of the global VLANs. Thus, security attacks such as MAC snooping on the current network architecture can be effectively avoided.

The schematic flow chart diagrams hereafter are generally set forth as logical flow chart diagrams. As such, the depicted order and labeled steps are indicative of one embodiment of the presented method. Other steps and methods can be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types can be employed in the flow chart diagrams, they are understood not to limit the scope of the corresponding method. Indeed, some arrows or other connectors can be used to indicate only the logical flow of the method. Additionally, the order in which a particular method occurs can or can not strictly adhere to the order of the corresponding steps shown.

Figure 4A:
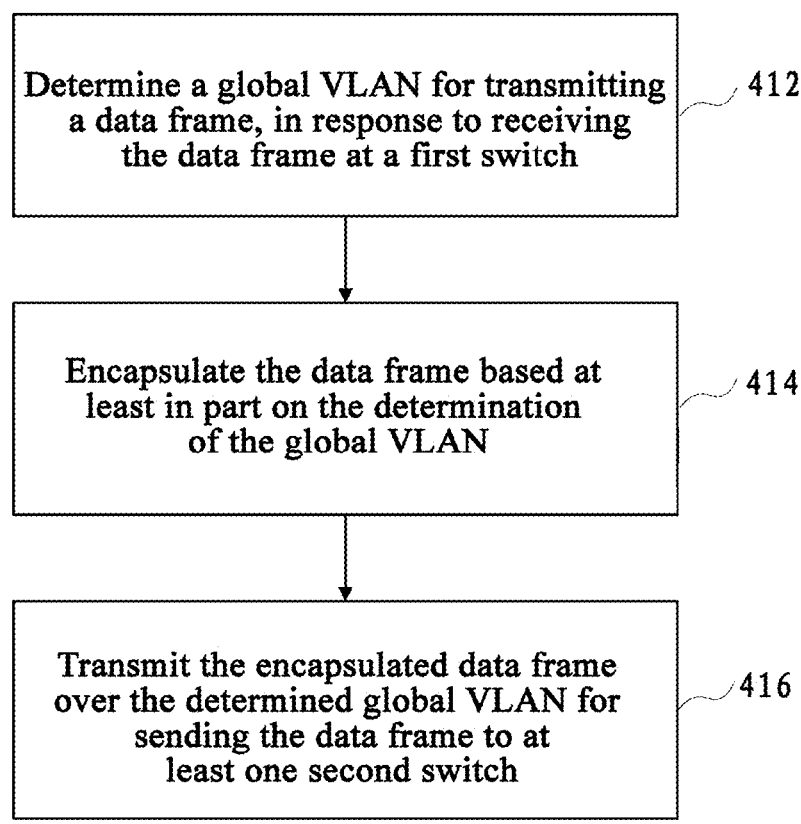
FIG. 4A is a flowchart illustrating a method for implementing a VLAN which can be performed at a transmitting switch according to an exemplary embodiment of the present invention.

FIG. 4A is a flowchart illustrating a method for implementing a VLAN according to an exemplary embodiment of the present invention, which can be performed at a transmitting switch (such as any one of $ToR_1$, $ToR_2$ and $ToR_3$ shown in FIG. 3) for data frames transmitted over a global VLAN. As shown in FIG. 4A, in step 412, in response to receiving a data frame at a first switch (such as $ToR_1$ shown in FIG. 3), a global VLAN for transmitting the data frame is determined, wherein the data frame is from one of one or more first local VLANs (such as VLAN 1 including hosts 110 and 111 shown in FIG. 3) served by the first switch. In step 414, the data frame is encapsulated based at least in part on the determination of the global VLAN (such as Multicast Group 1 shown in FIG. 3). In step 416, the encapsulated data frame can be transmitted over the determined global VLAN, so that the data frame can be sent to at least one second switch (such as $ToR_2$ shown in FIG. 3), wherein the second switch serves one or more second local VLANs (such as VLAN 1 including hosts 120 and 121 shown in FIG. 3).

For example, the data frame can comprise a unicast frame or a broadcast frame. In case of the unicast frame, according to an exemplary embodiment of the present invention, the operation of determining the global VLAN can comprise: querying a directory server with addresses of a source host and a destination host of the data frame to verify whether the source host and the destination host belong to the same global VLAN, wherein the source host belongs to one of the one or more first local VLANs, and the destination host belongs to one of the one or more second local VLANs. The operation of determining the global VLAN can further comprise: obtaining an address (such as IP address) of the second switch from the directory server, if the source host and the destination host of the data frame belong to the same global VLAN (which can also be determined in step 412 as the global VLAN for transmitting the data frame). As an example, if the source host and the destination host of the data frame do not belong to the same global VLAN, the first switch as the transmitting switch can perform a process of refusing communications, for example simply discarding the data frame. In case of the broadcast frame, according to another exemplary embodiment of the present invention, the operation of determining the global VLAN can comprise: querying a directory server with an address of a source host of the data frame to determine the global VLAN to which the source host belongs. The operation of determining the global VLAN can further comprise: obtaining a multicast address corresponding to the global VLAN from the directory server.

According to an exemplary embodiment of the present invention, the operation of encapsulating the data frame can comprise: adding at least a source address and a destination address to the data frame. In one exemplary embodiment with respect to the unicast frame, the source address can comprise an address of the first switch (such as an IP address of the transmitting access switch), and the destination address can comprise an address of the second switch (such as an IP address of the receiving access switch). Alternatively, in an exemplary embodiment with respect to the broadcast frame, the source address can comprise an address of the first switch, and the destination address can comprise a multicast address corresponding to the determined global VLAN (such as an IP multicast address of the underlying L3 network connecting the transmitting and receiving switches).

Figure 4B:
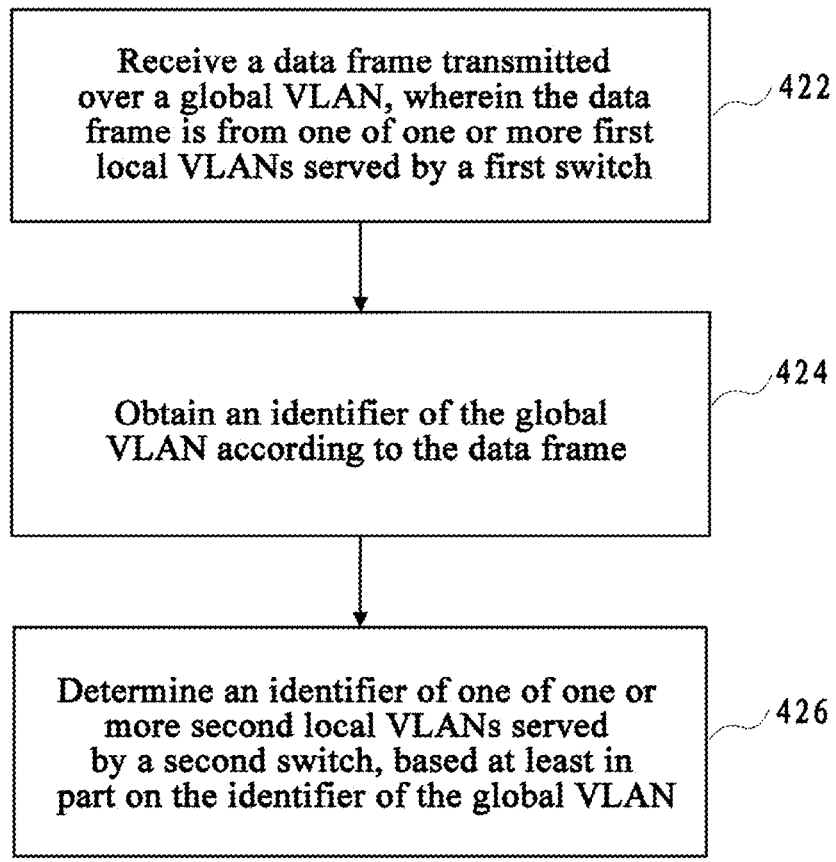
FIG. 4B is a flowchart illustrating a method for implementing a VLAN which can be performed at a receiving switch according to an exemplary embodiment of the present invention.

FIG. 4B is a flowchart illustrating a method for implementing a VLAN according to an exemplary embodiment of the present invention, which can be performed at a receiving switch (such as any one of $ToR_1$, $ToR_2$ and $ToR_3$ shown in FIG. 3) for data frames transmitted over a global VLAN. As shown in FIG. 4B, in step 422, a data frame transmitted over a global VLAN (such as Multicast Group 1 shown in FIG. 3) is received, wherein the data frame is from one of one or more first local VLANs (such as VLAN 1 including hosts 110 and 111 shown in FIG. 3) served by a first switch (such as $ToR_1$ shown in FIG. 3). In step 424, an identifier of the global VLAN can be obtained according to the received data frame. Based at least in part on the obtained identifier of the global VLAN, in step 426, an identifier of one of one or more second local VLANs served by a second switch (such as $ToR_2$ shown in FIG. 3) can be determined, so that the de-capsulated data frame can be sent to the second local VLAN identified by the determined identifier (such as VLAN 1 including hosts 120 and 121 shown in FIG. 3).

According to an exemplary embodiment of the present invention, the received data frame can be de-capsulated, for example by removing an IP header. In the case of receiving a unicast frame, the operation of obtaining the identifier of the global VLAN can comprise: obtaining an address of a destination host of the data frame from the de-capsulated data frame; querying a directory server with the address of the destination host; and obtaining from the directory server the identifier of the global VLAN corresponding to the address of the destination host. Alternatively, in the case of receiving a broadcast frame, the operation of obtaining the identifier of the global VLAN can comprise: obtaining from the data frame a multicast address corresponding to the global VLAN; querying a directory server with the multicast address; and obtaining from the directory server the identifier of the global VLAN corresponding to the multicast address. For example, with the obtained identifier of the global VLAN, an identifier of a local VLAN corresponding to the obtained identifier of the global VLAN can be queried locally (for example at the second switch), which identifies the local VLAN to which the destination of the data frame belongs. In an exemplary embodiment of the present invention, if the queried identifier of the local VLAN is different from that carried in the received data frame, then the identifier of the local VLAN carried in the data frame is modified to the queried identifier of the local VLAN. In this way, the second switch can send the unicast frame to the local VLAN identified by the determined local VLAN identifier, and the destination host specified by the unicast frame can receive this unicast frame. Alternatively, the second switch can send the broadcast frame to the local VLAN identified by the determined local VLAN identifier, and all hosts belonging to this local VLAN can receive the broadcast frame.

According to an exemplary embodiment of the present invention, the method described above with respect to FIG. 4A and FIG. 4B can be implemented on a L2 virtual Ethernet over an underlying L3 IP network. The flexible and effective VLAN approach provided by the present invention is based on a virtual L2 network over a commodity L3 TCP/IP network. Hosts or servers within a local node can switch L2 frames locally, which can support the conventional IEEE 802.1Q VLAN. Each node can connect to other nodes through a commodity L3 switch with an extension module. ToRs included in nodes can be connected with each other to form the underlying L3 TCP/IP network. With MAC encapsulation in IP packet and L3 multicast technology, a unicast packet to a remote MAC address and a multicast packet can reach to a remote host or server within another node. Multiple hosts or servers are logically in a virtual flat local area network. For example, VLAN can be defined on the flat virtual local area network by means of configurations in a directory server. In an exemplary embodiment of the present invention, the administrator can group hosts according to demands of users, so that these hosts can correspond to different global VLANs. The administrator can allocate one multicast group of an underlying L3 network for each global VLAN, and establish on the directory server some records of correspondence relationships among each host's address, a global VLAN and a multicast address of a corresponding multicast group. For example, at least one of the following fields or information can be stored on the directory server:

Server/Host Address, which can be a MAC address of a network interface card on a server/host for uniquely identifying the server/host;

Global VLAN identifier, which can represent ID of a global VLAN to which the server/host belongs;

Corresponding Multicast Group, which can be an IP multicast address corresponding to the global VLAN; and Switch Address, which can be an IP address of a L3 access switch for a local VLAN to which the server/host belongs.

According to an exemplary embodiment of the present invention, the L3 IP network connecting access switches of different nodes can also connect with a directory server (DS), and the DS can communicate with respective access switches through the IP network, for example, querying and exchanging information. As an example, the directory server can be any type of database or server having information storage and querying functionalities.

Figure 4C:
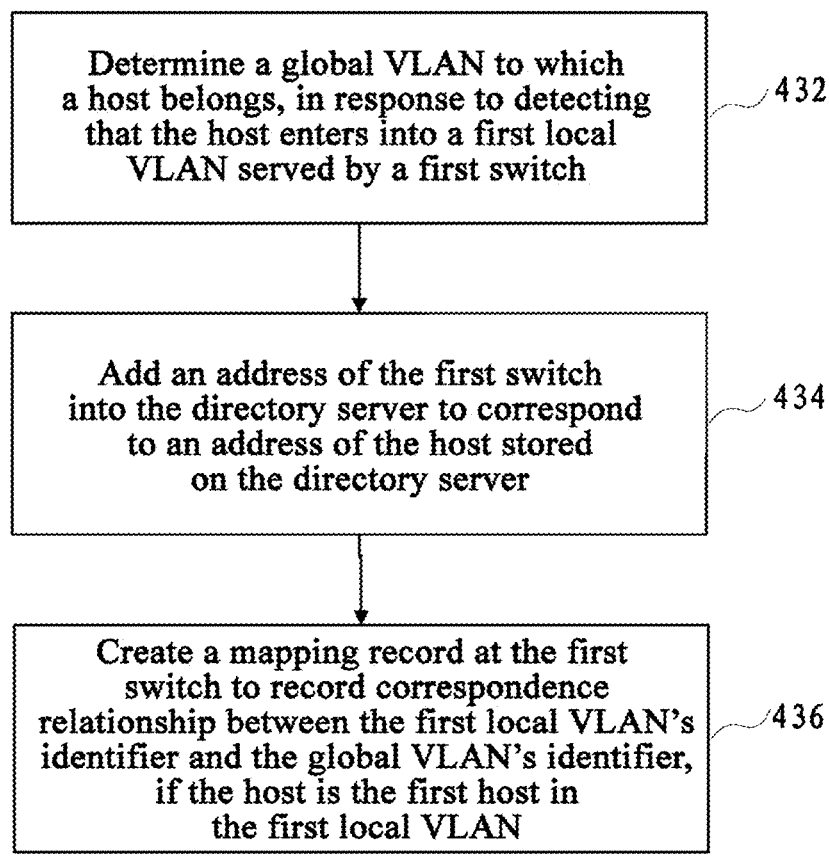
FIG. 4C is a flowchart illustrating a method for configuring a VLAN which can be performed at a switch according to an exemplary embodiment of the present invention.

FIG. 4C is a flowchart illustrating a method for configuring a VLAN which can be performed at a switch according to an exemplary embodiment of the present invention. In step 432, in response to detecting that a host enters into a first local VLAN served by a first switch, a global VLAN to which the host belongs can be determined, so that a data frame from the host can be transmitted over the determined global VLAN to at least one second switch which can serve one or more second local VLANs. For example, according to an address of the host (such as MAC address), the first switch can query a directory server for the global VLAN to which the host belongs and a corresponding multicast group in an underlying network, and the first switch can join in this multicast group to support communications within the multicast group. In step 434, an address of the first switch can be added to the directory server, which corresponds to the address of the host stored on the directory server. For example, the first switch can use its own IP address to fill or modify "Switch Address" field with respect to the host recorded on the DS. If the host is the first host in the first local VLAN, then in step 436, a mapping record can be created at the first switch to record correspondence/mapping relationship between the first local VLAN's identifier and the determined global VLAN's identifier. For example, the first switch can allocate a local IEEE 802.1Q tag to the first local VLAN, and add one piece of correspondence record in a locally stored Global/Local VLAN correspondence table. With this method, the first switch can join in a multicast group in the underlying network, this multicast group corresponding to the determined global VLAN for the host. As such, the host can normally process an input/output data frame (such as Ethernet frame) on the L2 virtual network (such as the local VLAN), and can also send the data frame through the first switch to one or more second switches on the global VLAN, whereby the second switch can forward the data frame to one or more other hosts.

According to an exemplary embodiment of the present invention, the method can further comprise the step of: in response to detecting that the host leaves the first local VLAN (for example disconnected), removing by the first switch the address of the first switch (for example, the field corresponding to an IP of the L3 access switch) corresponding to the address of the host stored on the directory server. In an exemplary embodiment of the present invention, the method can further comprise the step of: if the host is the last host in the first local VLAN, then deleting by the first switch the mapping record which records the correspondence relationship between the first local VLAN's identifier and the identifier of the global VLAN to which the host belongs (such as a respective record in the Global/Local VLAN correspondence table stored locally). In particular, the first switch can query (for example from the DS) the global VLAN to which the host belongs and the corresponding multicast group in the underlying network, according to the address (such as MAC address) of the host. If the host is the last host in the local VLANs for this global VLAN, the first switch can leave this multicast group in the underlying network.

The methods for implementing and configuring a VLAN according to exemplary embodiments are described above. It should be noted that the described methods are merely as examples, instead of limiting the present invention. The methods for implementing and configuring a VLAN of the present invention can have more, less or different steps, and some steps can be combined into a single step or further divided into sub-steps, and the order of some steps can be changed or executed in parallel.

Figure 5A:
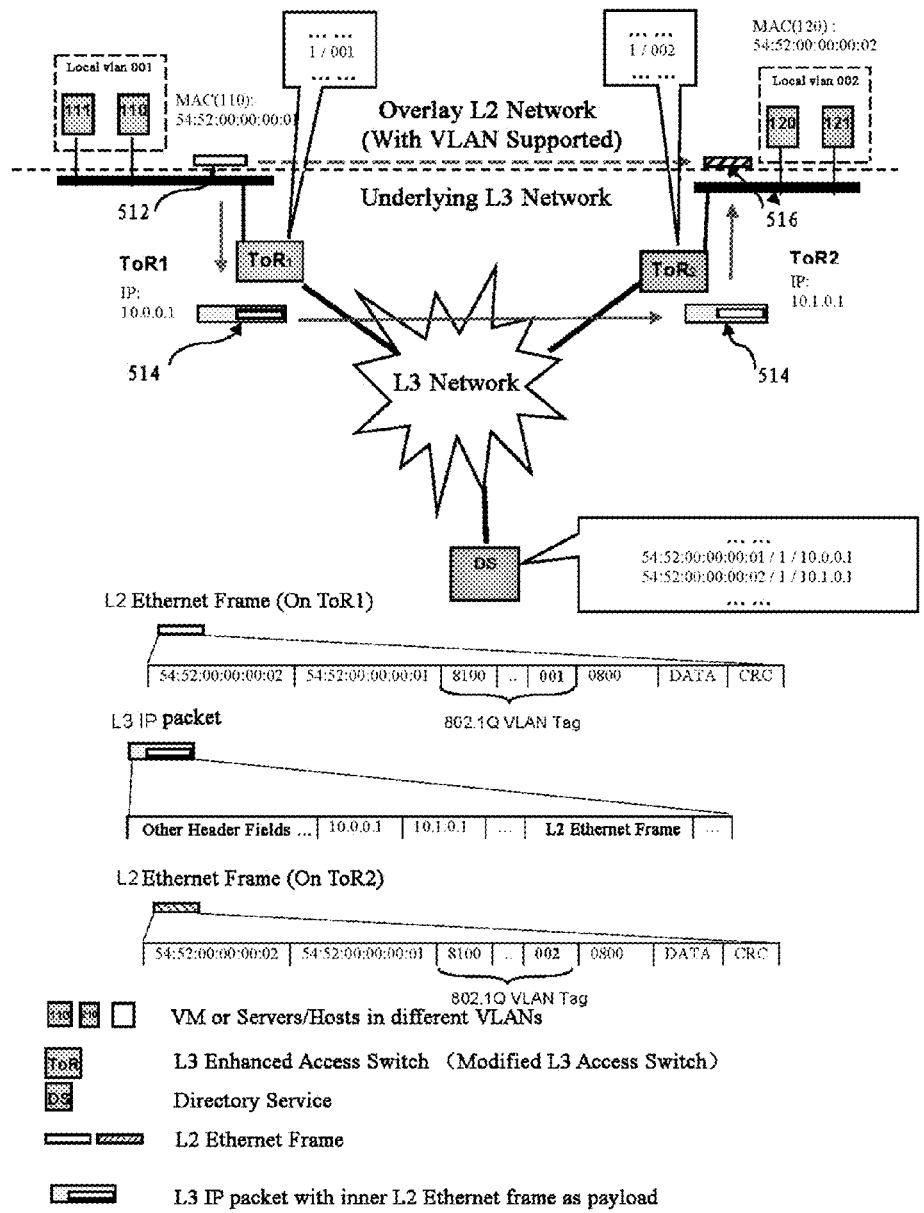
FIG. 5A is a schematic diagram illustrating the implementation of unicast within a L2 virtual Ethernet over an underlying L3 IP network according to an exemplary embodiment of the present invention.
Figure 5B:
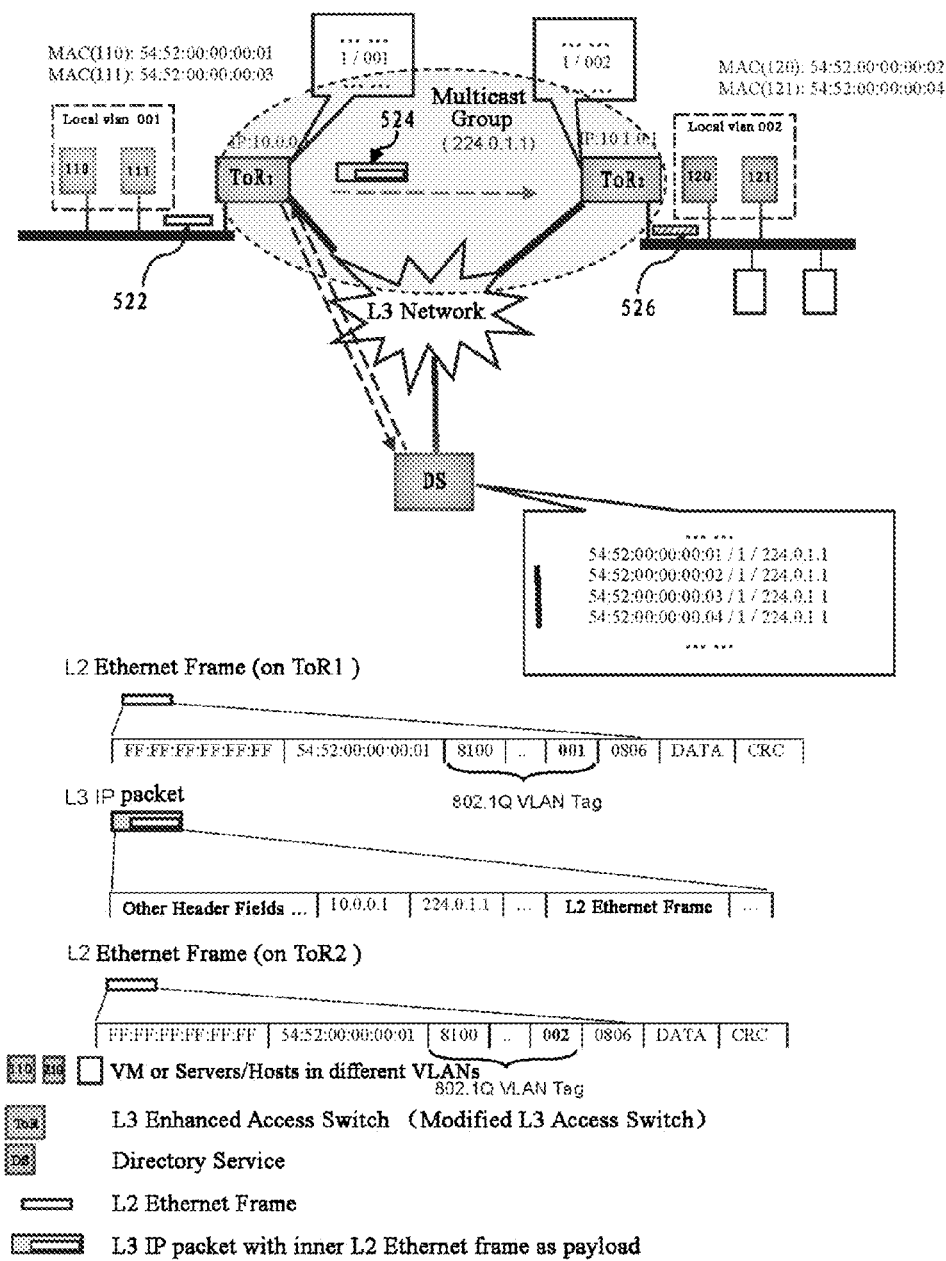
FIG. 5B is a schematic diagram illustrating the implementation of broadcast within a L2 virtual Ethernet over an underlying L3 IP network according to an exemplary embodiment of the present invention.

FIG. 5A is a schematic diagram illustrating the implementation of unicast within a L2 virtual Ethernet over an underlying L3 IP network according to an exemplary embodiment of the present invention. Accordingly, FIG. 5B is a schematic diagram illustrating the implementation of broadcast within a L2 virtual Ethernet over an underlying L3 IP network according to an exemplary embodiment of the present invention. For the purpose of illustration, FIG. 5A and FIG. 5B take only two nodes as example, each node having an access switch connected to an external universal L3 IP network, wherein the access switches can perform functions as described above in conjunction with at least one of FIGS. 4A-4C. A directory server (DS) can also be connected to each access switch through the L3 IP network. According to an embodiment of the present invention, each node can include one or more L2 Ethernets therein. The L2 Ethernet can consist of one or more traditional L2 Ethernet switch connected thereto. IEEE 802.1Q VLAN functions can be supported in the L2 Ethernet. In particular, an Ethernet without using IEEE 802.1Q tag can be considered as a special case supporting IEEE 802.1Q VLAN, where all server hosts are within the same IEEE 802.1Q VLAN. As previously described with respect to FIG. 3 and FIGS. 4A-4C, IEEE 802.1Q VLAN within a node can be called as a local VLAN herein, and a VLAN constructed with the global virtual L2 Ethernet according to the embodiment of the present invention can be called as a global VLAN. At Node 1 including access switch $ToR_1$, assuming there are two server hosts 110 and 111, both belonging to Local VLAN 001. At Node 2 including access switch $ToR_2$, assuming there are two server hosts 120 and 121, both belonging to Local VLAN 002. It can be understood that an example of only two nodes (each having two hosts) are shown here just for illustrative purpose. In fact, the system according to embodiments of the present invention can have more nodes and corresponding access switches, and each node can include more hosts as well as one or more corresponding local VLANs. In addition, each switch can join in respective multicast groups of one or more global VLANs.

The working principle when implementing unicast within the L2 virtual network is described below in conjunction with FIG. 5A. Assuming a server host 110 sends a data frame (such as Ethernet frame) 512 to a server host 120. For example, a network interface card of an access switch $ToR_1$ of Node 1 works in a promiscuous mode. It can receive and process the data frame. The access switch $ToR_1$ can use source and destination addresses (such as, source and destination MAC addresses 54:52:00:00:00:01/54:52:00:00:00:02) of the data frame 512 to query the directory server for determining whether these two addresses belong to the same global VLAN. If the two addresses do not belong to the same global VLAN, then the directory server can return a result (such as not allowing communications) to the access switch $ToR_1$ of Node 1. Accordingly, the access switch $ToR_1$ can perform a process of refusing communications, for example simply discarding the data frame. If the source and destination addresses of the data frame belong to the same global VLAN, the directory server can return an address (such as IP address) of an access switch $ToR_2$ of a network having the destination host. After receiving the address, the access switch $ToR_1$ can use its own address (such as IP address) as an source address and the received address as a destination address to encapsulate the previously received data frame 512, for example, by adding an IP header to construct an IP packet 514. As a transmitting access switch, $ToR_1$ can send the encapsulated data frame (such as IP packet 514) to the receiving access switch $ToR_2$ over the underlying L3 network.

For example, the related fields or information stored in the directory server (DS) for query can comprise: Server/Host Address, Identifier of a Global VLAN to which it belongs, Corresponding Multicast Group, and Switch Address. Table 1 shows one example of main fields and corresponding information for respective hosts, which can be stored in the directory server.

TABLE 1

| | | DS Field | | |
|---|---|---|---|---|
| Host | Server MAC Address | Global VLAN ID to which it belongs | Corresponding Multicast Group | L3 Access Switch IP Address |
| 110 | 54:52:00:00:00:01 | 1 | 224.0.1.1 | 10.0.0.1 |
| 120 | 54:52:00:00:00:02 | 1 | 224.0.1.1 | 10.0.1.1 |
| 111 | 54:52:00:00:00:03 | 1 | 224.0.1.1 | 10.0.0.1 |
| 121 | 54:52:00:00:00:04 | 1 | 224.0.1.1 | 10.0.1.1 |
| ... | ... | ... | ... | ... |

Although Table 1 only shows records for one global VLAN (with Global VLAN ID of 1), it can be understood that the directory server can also have records for other different global VLANs and corresponding multicast groups as well as server hosts. Moreover, when the access switch detects that a specific host joins in the network, it can add a corresponding switch address according to the method as described in conjunction with FIG. 4C. It can be seen from Table 1 that Global VLAN ID corresponding to the source address 54:52:00:00:00:01 of the data frame 512 is 1, and Global VLAN ID corresponding to the destination address 54:52:00:00:00:02 is also 1, whereby it can be determined that the source and destination addresses of the data frame belong to the same global VLAN. Thus the directory server can return an IP address of the access switch $ToR_2$ of the network having the destination host to $ToR_1$ for constructing a L3 IP packet.

After receiving the encapsulated data frame (such as IP packet 514), as the receiving access switch, ToR₂ can de-capsulate it (for example removing an IP header), and extract the data frame (such as Ethernet frame) 512 therein. The access switch ToR₂ can query the directory server with the destination address of the data frame (such as MAC address 54:52:00:00:00:02) to obtain an ID of the global VLAN (such as, Global VLAN ID 1) to which the destination address belongs. The access switch ToR₂ can get a local VLAN ID corresponding to this global VLAN ID, by querying its own Global/Local VLAN correspondence table. According to an exemplary embodiment of the present invention, a table recording correspondence relationship between global VLAN IDs and local VLAN IDs can be maintained in the access switch of each node. Table 2 (a) and Table 2 (b) exemplarily shows Global/Local VLAN correspondence tables stored in switch ToR₁ and switch ToR₂, respectively.

TABLE 2 (a)

Switch ToR₁

| Global VLAN ID | Local VLAN ID |
|---|---|
| 1 | 001 |
| 2 | 002 |
| 5 | 003 |
| ... | ... |

TABLE 2 (b)

Switch ToR₂

| Global VLAN ID | Local VLAN ID |
|---|---|
| 1 | 002 |
| 2 | 003 |
| 3 | 001 |
| ... | ... |

In this example, since the local VLAN ID from the de-capsulated data frame is 001 while the corresponding local VLAN ID queried by the access switch ToR₂ from its own Global/Local VLAN correspondence table is 002, the access switch ToR₂ needs to modify the local VLAN ID (such as IEEE 802.1Q tag) within the data frame to 002, and the resulted data frame 516 can be sent to the local L2 Ethernet identified by the local VLAN ID 002. In another exemplary embodiment, the access switch ToR₂ can query from its own Global/Local VLAN correspondence table that the local VLAN ID is also 001. In this case, ToR₂ can send the data frame 516 to the corresponding local L2 Ethernet without modifying the local VLAN ID within the de-capsulated data frame. As such, an Ethernet switch at the last level (which is connected with the server host 120) can receive the data frame 516, remove IEEE 802.1Q VLAN tag, and then send it to the server host 120. From the point of view of the server host 120, the server host 110 appears as if it is in the same local VLAN of the same L2 Ethernet with the server host 120. Those intermediate transformation processes are transparent to the server host 120.

The working principle when implementing broadcast within the L2 virtual network is described below in conjunction with FIG. 5B. Assuming a server host 110 sends a data frame (such as Ethernet broadcast frame) 522 to all hosts within a global VLAN to which the server host 110 belongs. For all server hosts within the same local VLAN within a node, they will receive the broadcast frame 522, which is a functionality the local Ethernet switch can have. For example, a network interface card of an access switch ToR₁ of Node 1 works in a Promiscuous mode, and it will receive and process the broadcast frame 522. The access switch ToR₁ can use a source address (such as, source MAC address 54:52:00:00:00:01) of the broadcast frame 522 to query a directory server. According to this address, the directory server can return an ID of a global VLAN to which the host 110 belongs and a corresponding multicast address (such as IP address 224.0.1.1). After receiving the multicast address, the access switch ToR₁ can use its own address (such as IP address) as a source address and the multicast address as a destination address to encapsulate the previously received data frame 522, for example, by adding an IP header for constructing an IP multicast packet 524. As a transmitting access switch, ToR₁ can multicast the encapsulated data frame (such as IP multicast packet 524) within the corresponding multicast group over the underlying L3 network. Since the access switch ToR₂ is also within this multicast group, it will receive the multicast packet 524, de-capsulate it (for example removing an IP header), and extract the data frame 522 therein. The access switch ToR₂ can query the directory server with the multicast address (such as 224.0.1.1) to obtain a global VLAN ID (such as, Global VLAN ID 1) corresponding to this address, and query its own Global/Local VLAN correspondence table to get a local VLAN ID (such as Local VLAN ID 002) corresponding to this global VLAN ID. Similar to the case of the unicast frame, since the local VLAN ID within the de-capsulated data frame is 001, the access switch ToR₂ needs to modify the local VLAN ID (such as IEEE 802.1Q tag) within the data frame to 002, and the resulted data frame 526 can be sent to the local L2 Ethernet identified by the local VLAN ID 002. In another exemplary embodiment, the access switch ToR₂ can query from its own Global/Local VLAN correspondence table that the local VLAN ID is also 001. In this case, ToR₂ can send the data frame 526 to the corresponding local L2 Ethernet without modifying the local VLAN ID within the de-capsulated data frame. As such, all server hosts within the local VLAN identified by the local VLAN ID 002 will receive the broadcast frame 526, as if it is sent by some host within the same local VLAN.

The solution proposed by the present invention can bring many benefits. For example, the solution can achieve good compatibility with the existing standard IEEE 802.1Q. In addition, since a VLAN ID is within a local switch, it can be private in a local user virtual network, while the same VLAN ID can be used in different user virtual networks. The solution can also have an initial definition that all servers/hosts not configured into a VLAN are initially isolated instead of belonging to a default VLAN (or broadcast domain). For example, a host not defined on a directory server cannot participate in communications. In an exemplary embodiment of the present invention, the total number of global VLANs can dependent on the number of multicast groups being supported by an underlying network (such as IPv4 28 bit or IPv6 112 bit), which greatly increases the number of available VLANs. The centralized VLAN membership configuration can reduce management overhead, and provide possibility to apply more complex membership definition rules for emerging DCN applications. For example, the directory server can be dynamically updated, and convenience can be provided for accessing data and information. The solution according to embodiments of the present invention can also provide good support to the DCN architecture. In addition, the solution can further bring many security benefits, for example, providing security of control channel, avoiding some security attacks (such as MAC snooping) in the existing network framework, and so on.

Figure 6A:
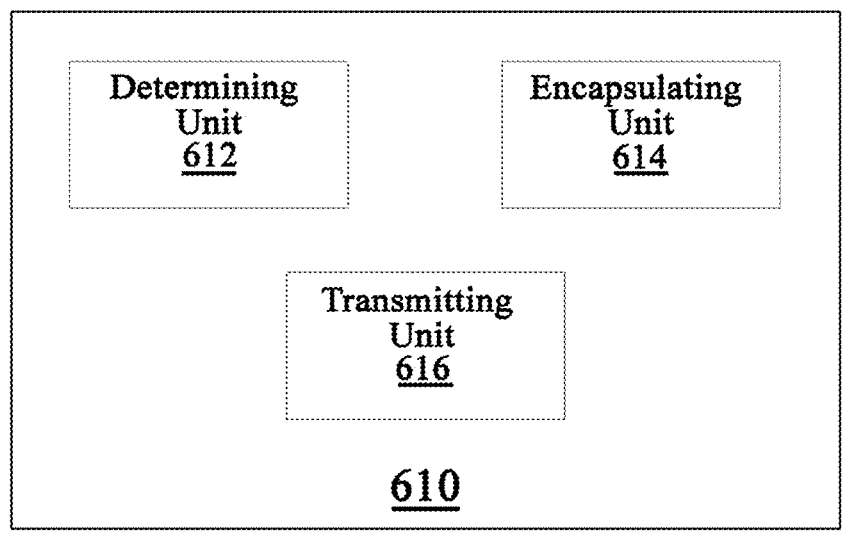
FIG. 6A is a block diagram of an apparatus for implementing a VLAN according to an exemplary embodiment of the present invention.

FIG. 6A is a block diagram of an apparatus 610 for implementing a VLAN according to an exemplary embodiment of the present invention. The apparatus 610 comprises components or units which can implement process steps and corresponding functions thereof as shown in conjunction with FIG. 4A. In an exemplary embodiment of the present invention, the apparatus 610 can comprise a determining unit 612, an encapsulating unit 614 and a transmitting unit 616. For example, the determining unit 612 can be configured to determine a global VLAN for transmitting a data frame, in response to receiving the data frame at a first switch, wherein the data frame is from one of one or more first local VLANs served by the first switch. The encapsulating unit 614 can be configured to encapsulate the data frame based at least in part on the determination of the global VLAN. The transmitting unit 616 can be configured to transmit the encapsulated data frame over the determined global VLAN for sending the data frame to at least one second switch, wherein the second switch serves one or more second local VLANs. In an embodiment, the determining unit 612 can be configured to query a directory server with addresses of a source host and a destination host of the data frame to verify whether the source host and the destination host belong to the same global VLAN. If the source host and the destination host belong to the same global VLAN, the determining unit 612 can be further configured to obtain an address of the second switch from the directory server. In another embodiment, the determining unit 612 can be configured to query the directory server with an address of a source host of the data frame to determine the global VLAN to which the source host belongs, and then obtain from the directory server a multicast address corresponding to the global VLAN. Accordingly, the encapsulating unit 614 can be configured to add at least a source address and a destination address to the data frame, wherein the source address can comprise an address of the first switch, and the destination address can comprise the address of the second switch (for a unicast frame) or the multicast address corresponding to the determined global VLAN (for a broadcast frame).

Figure 6B:
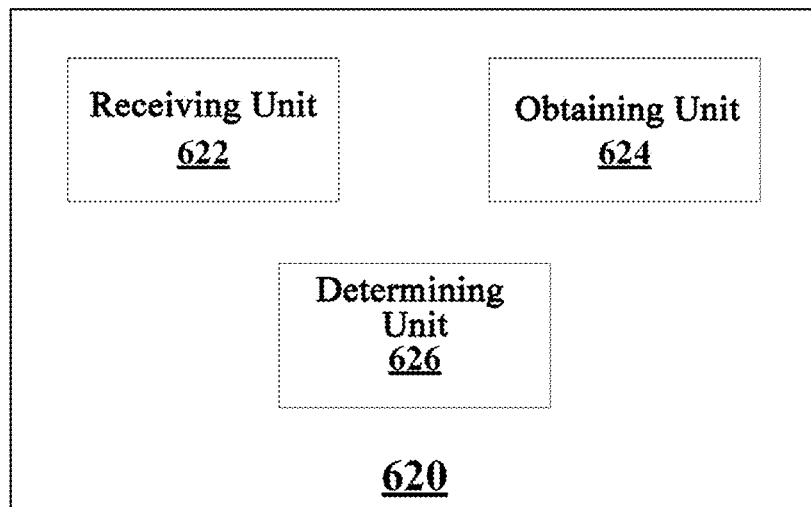
FIG. 6B is a block diagram of an apparatus for implementing a VLAN according to another exemplary embodiment of the present invention.

FIG. 6B is a block diagram of an apparatus 620 for implementing a VLAN according to another exemplary embodiment of the present invention. The apparatus 620 comprises components or units which can implement process steps and corresponding functions thereof as shown in conjunction with FIG. 4B. In an exemplary embodiment of the present invention, the apparatus 620 can comprise a receiving unit 622, an obtaining unit 624 and a determining unit 626. For example, the receiving unit 622 can be configured to receive a data frame transmitted over a global VLAN, wherein the data frame is from one of one or more first local VLANs served by a first switch. The obtaining unit 624 can be configured to obtain an identifier of the global VLAN according to the data frame. The determining unit 626 can be configured to determine, based at least in part on the identifier of the global VLAN, an identifier of one of one or more second local VLANs served by a second switch to send the de-capsulated data frame to the second local VLAN identified by the determined identifier. In an embodiment, the receiving unit 622 can be further configured to de-encapsulate the received data frame. The obtaining unit 624 can be configured to obtain an address of a destination host of the data frame from the de-capsulated data frame, and query a directory server with this address to obtain the identifier of the global VLAN corresponding to the address of the destination host. In another embodiment, the obtaining unit 624 can be configured to obtain from the received data frame a multicast address corresponding to the global VLAN, and query the directory server with this multicast address to obtain the identifier of the global VLAN corresponding to the multicast address. Accordingly, the determining unit 626 can be configured to query a Local/Global VLAN ID correspondence table with the identifier of the global VLAN, for determining which local VLAN served by the second switch the de-encapsulated data frame can be sent to. In an exemplary embodiment, the determining unit 626 can be further configured to modify a local VLAN ID in the de-encapsulated data frame to the queried local VLAN ID, if the queried local VLAN ID is different from that carried in the data frame.

Figure 6C:
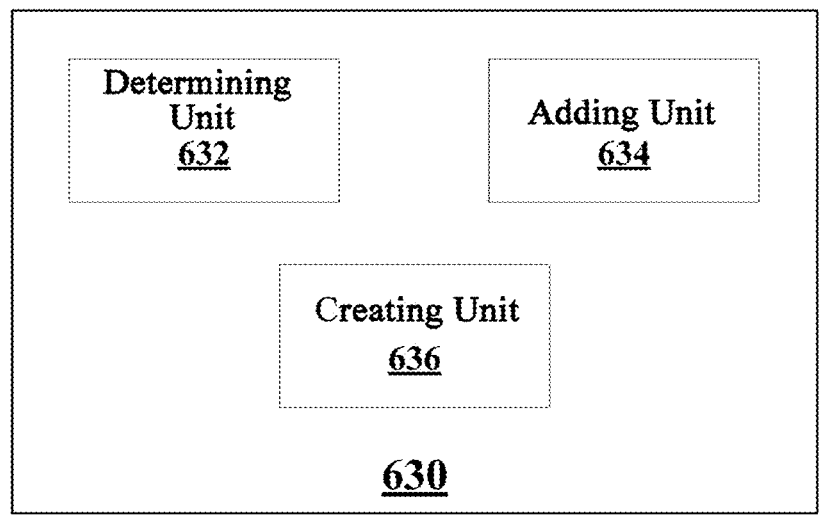
FIG. 6C is a block diagram of an apparatus for configuring a VLAN according to an exemplary embodiment of the present invention.

FIG. 6C is a block diagram of an apparatus 630 for configuring a VLAN according to an exemplary embodiment of the present invention. The apparatus 630 comprises components or units which can implement process steps and corresponding functions thereof as shown in conjunction with FIG. 4C. In an exemplary embodiment of the present invention, the apparatus 630 can comprise a determining unit 632, an adding unit 634 and a creating unit 636. For example, the determining unit 632 can be configured to determine a global VLAN to which a host belongs, in response to detecting that the host enters into a first local VLAN served by a first switch. When receiving the data frame from the host, the first switch can transmit the data frame to at least one second switch over the global VLAN, wherein the second switch serves one or more second local VLANs. The adding unit 634 can be configured to add an address of the first switch to a directory server for corresponding to an address of the host stored on the directory server. The creating unit 636 can be configured to create a mapping record at the first switch if the host is the first host in the first local VLAN, which records a correspondence relationship between an identifier of the first local VLAN and an identifier of the global VLAN. In another exemplary embodiment of the present invention, the apparatus 630 can further comprise a removing unit and a deleting unit (not shown). For example, the removing unit can be configured to remove, in response to detecting that the host leaves the first local VLAN, the address of the first switch corresponding to the address of the host stored on the directory server. The deleting unit can be configured to delete, if the host is the last host in the first local VLAN, the mapping record stored at the first switch which records the correspondence relationship between the identifier of the first local VLAN and the identifier of the global VLAN.

In exemplary embodiments of the present invention, the first apparatus 610, the second apparatus 620 and the third apparatus 630 can be deployed on or integrated into an access switch, so that the switch can perform operations of a transmitting switch and a receiving switch as well as the automatic configuration and application of a global VLAN. It can be understood that, during the deployment or integration of the first apparatus 610, the second apparatus 620 and the third apparatus 630, the purpose of simplifying device construction can be achieved by combining one or more units and functions thereof. Optionally, one or more units and functions thereof in these apparatuses can also be split to achieve a further refinement of operation processes. In an exemplary embodiment, a commodity L3 switch can comprise the apparatuses 610, 620 and 630 to expand its existing function modules. A ToR as a transmitting switch can query the directory server to get an IP address of a remote ToR, and encapsulate a L2 frame with an outer IP packet. The directory server stores a mapping for a L2 MAC address, an IP address of a remote ToR, and an address of a global multicast group to which the MAC address belongs. A ToR as a receiving switch can de-capsulate the received IP packet, and deliver an inner L2 frame to a local L2 network accordingly. These ToRs connected with each other form an underlying L3 network, which can run routing protocols such as Open Shortest Path First (OSPF) to maintain connectivity between ToRs and achieve Equal-Cost Multipath Routing (ECMP) to improve system performance and load balancing. VMs or servers/hosts supported by a ToR are physically grouped and can switch L2 frames within the same one group. The MAC addresses of Network Interface Cards (NICs) of these VMs or servers/hosts can be registered into the directory server. In an exemplary embodiment, a global VLAN can be defined according to the MAC addresses.

The specific embodiments of the respective units, apparatuses and devices hereinabove can refer to the previous detailed descriptions in conjunction with process flows and specific examples, and no more details are given here.

Figure 7:
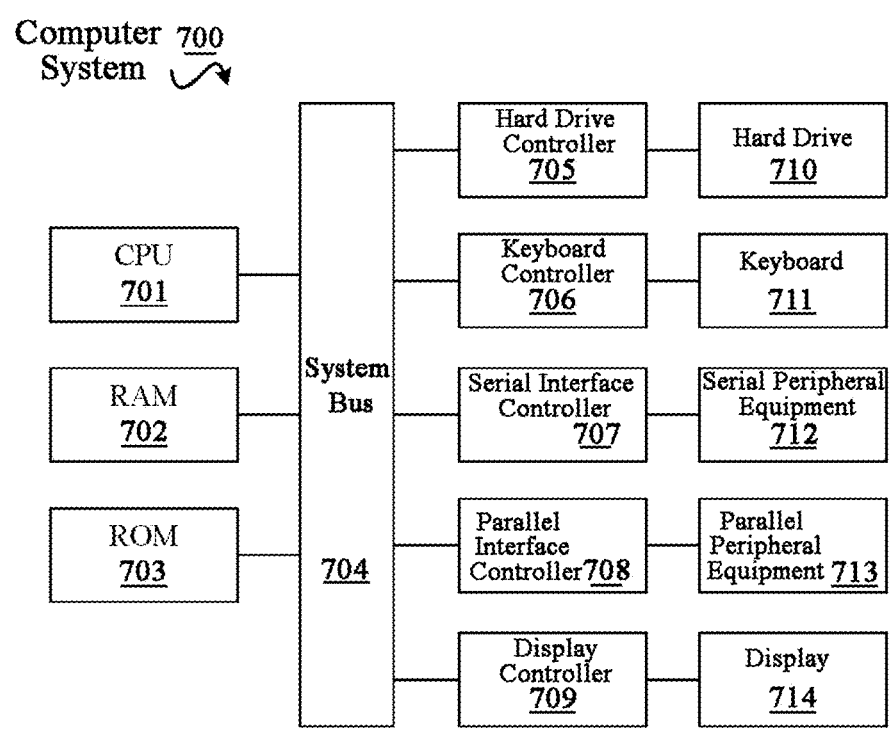
FIG. 7 shows a block diagram of an exemplary computer system which is applicable to implement the embodiments of the present invention.

The methods and apparatuses for implementing and configuring a VLAN described above can be implemented with a computer system. FIG. 7 shows an exemplary computer system 700 which is applicable to implement the embodiments of the present invention. As shown in FIG. 7, the computer system 700 can include: CPU (Central Process Unit) 701, RAM (Random Access Memory) 702, ROM (Read Only Memory) 703, System Bus 704, Hard Drive Controller 705, Keyboard Controller 706, Serial Interface Controller 707, Parallel Interface Controller 708, Display Controller 709, Hard Drive 710, Keyboard 711, Serial Peripheral Equipment 712, Parallel Peripheral Equipment 713 and Display 714. Among above devices, CPU 701, RAM 702, ROM 703, Hard Drive Controller 705, Keyboard Controller 706, Serial Interface Controller 707, Parallel Interface Controller 708 and Display Controller 709 are coupled to the System Bus 704. Hard Drive 710 is coupled to Hard Drive Controller 705. Keyboard 711 is coupled to Keyboard Controller 706. Serial Peripheral Equipment 712 is coupled to Serial Interface Controller 707. Parallel Peripheral Equipment 713 is coupled to Parallel Interface Controller 708. And, Display 714 is coupled to Display Controller 709. It should be understood that the structure as shown in FIG. 7 is only for the exemplary purpose rather than any limitation to the present invention. In some cases, some devices can be added to or removed from the computer system 700 based on specific situations.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the sequence noted in the figures. For example, two blocks shown in succession can, in fact, be executed substantially concurrently, or the blocks can sometimes be executed in the reverse sequence, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the methods, apparatuses and units of the present invention are described in detail in conjunction with specific embodiments, the present invention is not limited thereto. Those of ordinary skill in the art can contemplate many changes, substitutions and modifications of the present invention under the guidance of the teachings without departing from the spirit and scope of the present invention. It should be understood that all such changes, substitutions and modifications can still fall into the scope of the present invention. The scope of protection of the present invention is defined by the appended claims.

The invention claimed is:

1. A method for implementing a first level system of local virtual local area networks (VLANs) over an underlying second level network of a multitude of devices, each of the local VLANs including one or more of the multitude of devices, the second level network including a plurality of global VLANs, each of the global VLANs including a plurality of switches, and each of the switches serving one or more of the local VLANs, and wherein the devices migrate across boundaries of the VLANs and said multitude of devices includes a plurality of host devices, the method comprising:

as the devices migrate across the boundaries of the local VLANs, maintaining a table identifying the one of the VLANs to which each of said devices belongs;

transmitting data frames between the devices of the local VLANs;

using said table to maintain isolation between the local VLANs and connectivity within each local VLAN while the devices migrate across the VLAN boundaries by when transmitting one of the data frames from a first of the devices in a first of the local VLANs to a second of the devices, receiving said one of the data frames at a first of the switches serving said first local VLAN, determining, using said table, the one of the local VLANs having the second device, and determining one of the global VLANs having said first switch and another one of the switches serving the one of the local VLANs having the second device for transmitting the one of the data frames from the first local VLAN to said one VLAN having the second device , in response to receiving the data frame at the first switch;

encapsulating the data frame based at least in part on the determination of the global virtual local area network and said table; and transmitting the encapsulated data frame over the determined global virtual local area network from said first switch to said another switch; and maintaining in a directory server a mapping among the host devices, a global multicast group identifier, and a switch address to facilitate communications between different ones of the host devices in different ones of the VLANs; and wherein:

the transmitting the encapsulated data frame includes using the mapping in the directory server to obtain an address for said at least one second switch in said one or more second local virtual local area networks to maintain isolation of, and connectivity within, the global virtual local area network.

2. The method according to claim 1, wherein the data frame comprises a unicast frame, and wherein said determining the global virtual local area network comprises:
   querying the directory server with addresses of a source host and a destination host of the data frame to verify whether the source host and the destination host belong to the same global virtual local area network, wherein the destination host belongs to one of the one or more second local virtual local area networks; and
   obtaining an address of the second switch from the directory server, if the source host and the destination host belong to the global virtual local area network.

3. The method according to claim 1, wherein said encapsulating the data frame comprises adding at least the following information to the data frame:
   a source address comprising an address of the first switch; and
   a destination address comprising an address of the second switch.

4. The method according to claim 1, wherein the data frame comprises a broadcast frame, and wherein said determining the global virtual local area network comprises:
   querying the directory server with an address of a source host of the data frame to determine the global virtual local area network to which the source host belongs; and
   obtaining a multicast address corresponding to the global virtual local area network from the directory server.

5. The method according to claim 1, wherein said encapsulating the data frame comprises adding at least the following information to the data frame:
   a source address comprising an address of the first switch; and
   a destination address comprising a multicast address corresponding to the global virtual local area network.

6. An apparatus for implementing a first level system of local virtual local area networks (VLANs) over an underlying second level network of a multitude of devices, each of the local VLANs including one or more of the devices, the second level network including a plurality of global VLANs, each of the global VLANs including a plurality of switches, and each of the switches serving one or more of the local VLANs, and wherein the migrate across boundaries of the local VLANs and said multitude of devices includes a plurality of host devices, the apparatus comprising:
   a device/VLAN table for identifying the one of the local VLANs to which each of the devices belong as the devices migrate across boundaries of the local VLANs;
   a determining unit configured to determine, when a data frame is transmitted from a first of the devices in a first of the local VLANSs to a second of the devices, using said table, the one of the local VLANs having the second device, and to determine one of the global VLANs having said first switch and another one of the switches serving the one of the local VLANs having the second device for transmitting the data frame from the first local VLAN to said one VLAN having the second device, in response to receiving the data frame at the first switch;
   an encapsulating unit configured to encapsulate the data frame based at least in part on the determination of the one global virtual local area network and said table;
   a transmitting unit configured to transmit the encapsulated data frame over the determined global virtual local area network from the first switch to said another one of the switches, and wherein by using said table, isolation between the VLANs and connectivity within each VLAN are maintained while the devices migrate across boundaries of the VLANs; and
   a directory server for maintaining a mapping among the host devices, a global multicast groups identifier, and a switch address to facilitate communications between different ones of the host devices in different ones of the VLANs; and wherein:
   the transmitting unit uses the mapping in the directory server to obtain an address for said at least one second switch in said one or more second local virtual local area networks to maintain isolation of, and connectivity within, the global virtual local area network.

7. The apparatus according to claim 6, wherein the data frame comprises a unicast frame, and wherein said determining the global virtual local area network comprises:
   querying the directory server with addresses of a source host and a destination host of the data frame to verify whether the source host and the destination host belong to the same global virtual local area network, wherein the destination host belongs to one of the one or more second local virtual local area networks; and
   obtaining an address of the second switch from the directory server, if the source host and the destination host belong to the global virtual local area network.

8. The apparatus according to claim 6, wherein said encapsulating the data frame comprises adding at least the following information to the data frame:
   a source address comprising an address of the first switch; and
   a destination address comprising an address of the second switch.

9. The apparatus according to claim 6, wherein the data frame comprises a broadcast frame, and wherein said determining the global virtual local area network comprises:
   querying the directory server with an address of a source host of the data frame to determine the global virtual local area network to which the source host belongs; and
   obtaining a multicast address corresponding to the global virtual local area network from the directory server.

10. The apparatus according to claim 6, wherein said encapsulating the data frame comprises adding at least the following information to the data frame:
    a source address comprising an address of the first switch; and
    a destination address comprising a multicast address corresponding to the global virtual local area network.

11. A method for implementing a first level system of local virtual local area networks (VLANs) over an underlying second level network of a multitude of devices, each of the local VLANs including one or more of the devices, the second level network including a plurality of global VLANs, each of the global VLANs including a plurality of switches, and each of the switches serving one or more of the local VLANs, and wherein the devices migrate across boundaries of the local VLANs and said multitude of devices includes a plurality of host devices, the method comprising:
    as the devices migrate across the boundaries of the local VLANs, maintaining a table identifying the one of the local VLANs to which each of said devices belongs;
    receiving a data frame transmitted over one of the global VLANs, wherein the data frame is from a first of the devices in a first of the local virtual local area networks served by a first switch of the one global VLAN;
    obtaining an identifier of the one global virtual local area network according to the data frame;

determining, based at least in part on the identifier of the one global virtual local area network and said table, an identifier of a second of the local virtual local area networks served by a second switch of the one global VLAN to send the data frame de-capsulated to the second local virtual local area network identified by the determined identifier; and maintaining in a directory server a mapping among the host devices, a global multicast group identifier, and a switch address to facilitate communications between different ones of the host devices in different ones of the VLANs; and wherein:

the determining the identifier of the second of the local virtual local area networks includes using the mapping in the directory server to obtain the identifier of the second of the local virtual local area networks to maintain isolation of, and connectivity within, the global virtual local area network.

12. The method according to claim 11, wherein the data frame comprises a unicast frame, and wherein said obtaining the identifier of the global virtual local area network comprises:

obtaining an address of a destination host of the data frame from the de-capsulated data frame;

query the directory server with the address of the destination host; and obtaining the identifier of the global virtual local area network corresponding to the address of the destination host from the directory server.

13. The method according to claim 11, wherein the data frame comprises a broadcast frame, and wherein said obtaining the identifier of the global virtual local area network comprises:

obtaining a multicast address corresponding to the global virtual local area network from the data frame;

query the directory server with the multicast address; and obtaining the identifier of the global virtual local area network corresponding to the multicast address from the directory server.

14. An apparatus for implementing a first level system of local virtual local area networks (VLANs) over an underlying second level network of a multitude of devices, each of the local VLANs including one or more of the devices, the second level network including a plurality of global VLANs, each of the global VLANs including a plurality of switches, and each of the switches serving one or more of the local VLANs, and wherein the devices migrate across boundaries of the local VLANs and said multitude of devices includes a plurality of host devices, the apparatus comprising:

a device/VLAN table for identifying the one of the VLANs to which each of the devices belong as the devices migrate across boundaries of the VLANs;

a receiving unit configured to receive a data frame transmitted over one of the global virtual local area VLANs, wherein the data frame is from a first of the devices in a first of the local virtual local area networks served by a first switch of the one global VLAN;

an obtaining unit configured to obtain an identifier of the one global virtual local area network according to the data frame;

a determining unit configured to determine, based at least in part on the identifier of the global virtual local area network and said table, an identifier of a second of the local virtual local area networks served by a second switch of the one global VLAN to send the data frame de-capsulated to the second local virtual local area network identified by the determined identifier, and wherein by using said table, isolation between the VLANs and connectivity within each VLAN are maintained while the devices migrate across boundaries of the VLANs; and a directory server for maintaining a mapping among the host devices, a global multicast group identifier, and a switch address to facilitate communications between different ones of the host devices in different ones of the VLANs; and wherein:

the determining unit uses the mapping in the directory server to obtain the identifier of the second of the local virtual local area networks to maintain isolation of, and connectivity within, the global virtual local area network.

15. The apparatus according to claim 14, wherein the data frame comprises a unicast frame, and wherein said obtaining the identifier of the global virtual local area network comprises:

obtaining an address of a destination host of the data frame from the de-capsulated data frame;

query the directory server with the address of the destination host; and obtaining the identifier of the global virtual local area network corresponding to the address of the destination host from the directory server.

16. The apparatus according to claim 14, wherein the data frame comprises a broadcast frame, and wherein said obtaining the identifier of the global virtual local area network comprises:

obtaining a multicast address corresponding to the global virtual local area network from the data frame;

query the directory server with the multicast address; and obtaining the identifier of the global virtual local area network corresponding to the multicast address from the directory server.

* * * * *